Feb. 16, 1960 R. B. GETHMANN 2,925,542

DEFLECTION AND DYNAMIC CONVERGENCE SYSTEM
FOR MULTI-BEAM CATHODE RAY TUBES

Filed May 31, 1957

INVENTOR:
RICHARD B. GETHMANN,

BY Donald M. Tinkle

HIS ATTORNEY.

United States Patent Office 2,925,542

Patented Feb. 16, 1960

2,925,542

DEFLECTION AND DYNAMIC CONVERGENCE SYSTEM FOR MULTI-BEAM CATHODE RAY TUBES

Richard Barton Gethmann, Fayetteville, N.Y., assignor to General Electric Company, a corporation of New York Application May 31, 1957, Serial No. 662,876

6 Claims. (Cl. 317—200)

Figure 1:
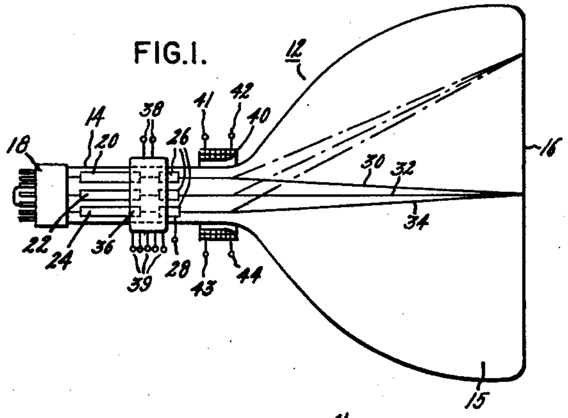

The present invention relates to a system for producing deflection and dynamic convergence of the plurality of beams in a multi-beam cathode ray tube.

Among the varieties of cathode ray tubes are several that utilize a plurality of electron guns for producing a plurality of beams. To provide a picture, all of the guns must be deflected by the magnetic field of the deflection yoke over the area of the tube face or screen. In most cathode ray tube applications it is essential that as the beams scan the screen they track, i.e. coincide, for every point on the screen or else the picture becomes fuzzy and defocussed. In color television applications there is also color fringing. Tracking requires convergence of the beams even though they enter the field of the deflection yoke as separate spaced beams. Because the tube screen is not the same distance from the electron guns for all points on the tube screen, the angles between the beams must be made different for many points on the tube screen if convergence is to be had. Also, these angles must be made to vary to compensate for convergence errors that are introduced by fringe effects of the deflection field.

The convergence problem has been attacked by the inclusion of structure in the tube that provides static and dynamic pre-deflection of the beams. By "pre-deflection" I mean deflection of the beams before they have been deflected appreciably from the tube axis by the field from the deflection yoke. Static pre-deflection is often accomplished through mechanical aiming of the electron guns or by the placing of permanent magnets or electro-magnets near the guns. Dynamic pre-deflection is usually accomplished by means of a horizontal pre-deflection set and a vertical pre-deflection set of electro-static plates or electro-magnetic coils that are situated between the guns and the deflection yoke. Each set of these plates or coils are energized by a source that produces a voltage having a complex wave form that is a function of the instantaneous magnitudes of currents in the horizontal and vertical coils of the deflection yoke. Due to their complexity, it is difficult to manufacture a device that will produce these waveforms.

Accordingly, an object of the present invention is to provide a deflection and convergence system that requires relatively less complex dynamic convergence waveforms.

The convergence wave form required for the horizontal pre-deflection set of most conventional deflection and convergence systems may be described by a mathematical expression involving the sums of the squares of the horizontal and vertical deflection currents. For the vertical pre-deflection set, the mathematical expression involves the product of the horizontal and vertical deflection currents. The squared terms for dynamic horizontal pre-deflection can be obtained by integration which is very easy to do electronically, but the product of the two currents for dynamic vertical pre-deflection must be done by some process such as modulation involving active elements such as tubes. Of course, tubes and their associated circuits are a costly item and it would be desirable to eliminate the need for them.

Thus, another object of the present invention is to provide a deflection and convergence system requiring no dynamic vertical pre-deflection.

In carrying out my invention in one form, I provide a deflection yoke comprising a toroidal core upon which there are wound windings having a unique distribution of conductors which distribution agrees with the equation:

$$n=N[(1-A)\ \sin\ (\theta+B)+A\ \sin^3\ (\theta+B)]$$

wherein $n$ is the number of the conductor the center of which is located at the quadrant angle $\theta$, N is larger by a number less than one than the whole number of the last turn in the quadrant of the core where the zero$^{th}$ term is located at $\theta=0$, A is a constant the exact value of which depends upon physical factors such as the shape of the deflection yoke core, and B is an angle that is 0 degrees for the horizontal winding and 90 degrees for the vertical winding if the guns lie in a horizontal plane. The constant A may be different in value and polarity for the two windings. With the magnetic field produced by a deflection yoke having the specified conductor distribution, it can be shown that no dynamic convergence is required in a direction normal to the plane in which the guns lie.

Figure 2:
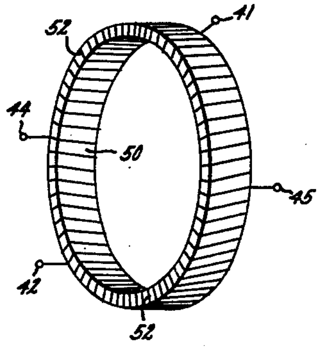
Figure 3:
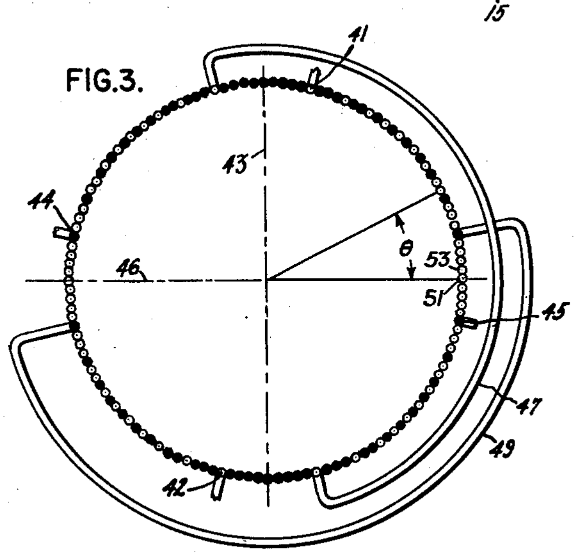
Figure 6:
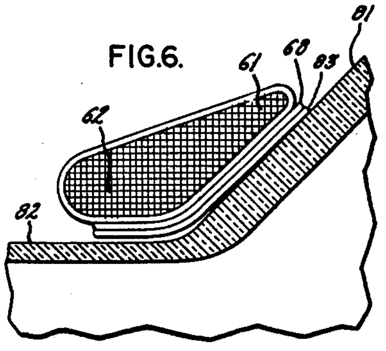
Figure 4:
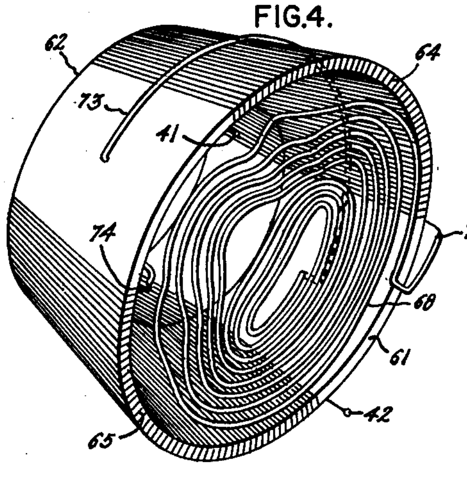
Figure 5:
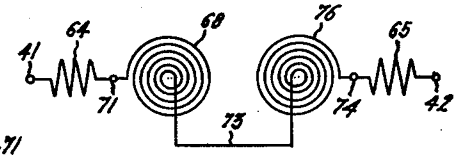

The features of my invention which I believe to be novel are set forth with particularity in the appended claims. My invention, itself, however, both as to its organization and method of operation, together with further objects and advantages thereof, may best be understood by reference to the following description taken in connection with the accompanying drawing, in which:

Fig. 1 is a top-cross-sectional view of a 3-gun color picture tube of the type in which the electron guns all lie in a plane, Fig. 2 is a perspective view of a toroidal deflection yoke, Fig. 3 is an end-view diagram of the distribution of the interior conductors of a toroidal yoke embodiment of my invention, Fig. 4 is a perspective view of a deflection yoke of another embodiment of my invention, Fig. 5 is a circuit diagram of one of the sets of windings of the deflection yoke of Fig. 4, and Fig. 6 is a partial cross-section of the yoke of Fig. 4 mounted on the neck of a picture tube.

In Fig. 1 there is shown a conventional color tube 12 comprising a neck 14, bulb 15, and screen 16. A tube socket 18, positioned on an end of neck 14, connects the matrix of the television receiver (not shown) to a gun system having three co-planar electron guns 20, 22, and 24 corresponding to three colors: red, blue, and green. There are three focusing electrodes 26 that when energized by a source (not shown) connected to terminal 28, function to develop three electron beams, 30, 32, and 34 from guns 20, 22, and 24, respectively. On neck 14 there is a plurality of dynamic and static convergence coils 36, that when energized at input terminals 38 and 39, respectively, converge beams 30, 32, and 34 on screen 16 at all points thereof. Also on neck 14 there is a toroidal deflection yoke 40 having a horizontal winding that when energized at terminals 41, 42 deflects the beams horizontally. It also has a vertical winding that when energized at two input terminals 43, 44 produces vertical deflection of these beams.

The dotted line showing of the beams 30, 32, and 34 is presented in addition to the full line showing to illustrate that the paths of these beams away from the center point of screen 16 are longer than the paths to this point. The difference in lengths of the paths is one reason why the waveforms energizing convergence coils 36 must be complex if the three beams 30, 32, and 34 are to converge for every point on screen 16.

In Fig. 2 there is shown a toroidal deflection yoke comprising a toroidal core 50 of material having a very high permeability that is preferably 100 or more. Two sets of conductors 52, one set comprising the horizontal winding and the other the vertical winding, are wound upon core 50 in an interleaving fashion with the result that the conductors 52 appear to form a simple solenoid winding.

Fig. 3 shows one interior conductor configuration for an embodiment of my invention of the yoke type shown in Fig. 2. The configuration for the horizontal winding agrees with the equation:

$$n=16.5[(1+.045)\sin\theta-.045\sin^3\theta]$$

For the vertical windings the only change that has to be made in this equation is the subtraction of 90 degrees from $\theta$. In this equation $n$ is the number of the conductor from 0 to 16 of the horizontal winding the center of which is located at the angle $\theta$ in a quadrant of core 52. It should be noted that the conductor numbering starts with zero. To find the angular position $\theta$ from the $\theta=0$ point for the zeroth horizontal winding conductor (conductor 51) one would insert the number "0" for $n$ and solve for $\theta$. To find $\theta$ for the number one conductor (conductor 53) "1" would be substituted for $\theta$, etc. There are a whole number of conductors of any one winding in a quadrant and not a whole number plus a fraction as the number 16.5 in the equation seems to indicate. The reason for the use of the number 16.5 rather than 16 is explained below. The number .045 is found experimentally and depends upon the particular core used, the spacing of the wires from the core and other physical factors.

In Fig. 3 the circles in black represent the conductors of a vertical winding and the white circles represent the conductors of a horizontal winding. Actually, the horizontal winding is a pair of winding sections one of which is located to the right of a vertical bisecting dividing line 43 and the other of which is located to the left of this line. The vertical winding is also a pair of winding sections, one of which is above a horizontal bisecting dividing line 46 and the other of which is below this line.

Terminal 41 is at one end of the right section of the horizontal winding. A conductor 47 connects the other end of this section to an end of the left section of the horizontal winding. Terminal 42 is at the other end of the left section of the horizontal winding.

Terminal 44 is at one end of the upper section of the vertical winding. A conductor 49 joins the other end of this section to an end of the lower section of the vertical winding. Terminal 45 is at the other end of this latter section.

The horizontal and vertical windings are so wound that neither winding generates any flux in the complete circle path of the toroidal core. In other words, although both the right and left sections of the horizontal winding produce flux, these sections are so wound and the circuit connections are such that the fluxes from them are equal and in opposite directions. Thus, the flux from the horizontal winding is zero in the core mid-way between the two horizontal sections. Consequently, for the flux from each path to find a complete circuit the flux must flow through the inside air gap of the toroidal core. To obtain this flux cancellation in the core, the two sections can be energized in parallel rather than in the shown series connection of Fig. 3. Whether parallel or series energization is used depends upon the direction in which the conductors in the two sections are wound and upon the external connections between the sections.

What has been said regarding the flux generated by the horizontal winding is equally true of the flux generated by the vertical winding. If the two sections of each of the vertical and horizontal windings did not produce fluxes in different directions in the toroidal core, there would be very little flux in the open center of this core as most of the flux would be in the core itself. Of course much flux is desired here because the beams 30, 32, and 34, that are to be deflected by the flux, pass through this center.

The reason that a non-integral number such as 16.5 is employed as N in the right side of the equation rather than an integral number, is that if an integral number is used the equation requires that the last conductor in the one horizontal section be adjacent the first conductor of the other horizontal section. This is undesired because as previously stated the flux generated by the conductors in the two sections are in opposite directions. Hence, the flux generated by these two adjacent conductors would cancel and these conductors would have no effect. Through the use of a non-integral number, a spacing can be had between the last conductor of one section and the first conductor of the other section. This is not only true for the horizontal winding but of course is true for the vertical winding as well. The exact number selected is not critical except that it must produce enough spacing. For example, N could have been 16.7 or 16.3.

It might be thought that $\theta$ is indicative of the angular position of conductor centers rather than conductors because a conductor center can be more accurately placed than a conductor inasmuch as a conductor has a finite width and a point has no width. But the fact is that only a few of the conductors in each quadrant need be so accurately placed, and these are the conductors that are in the angular regions in which the conductor density is low for the pertinent winding. Although it is ideal for the distribution of all of the conductors to agree with the equation, it is often difficult to place them in this manner because the required placing of some of the horizontal conductors causes them to interfere with the required placing for some of the vertical conductors. Thus, some averaging must be done which means that the angular positions for some of the conductor centers do not exactly agree with the equation.

The winding distribution shown in Fig. 3 is not the only type of distribution that could be obtained from the teachings of my invention. Broadly speaking, I have discovered that if a deflection yoke winding distribution is such that on a circle concentric with the core and laying on a plane bisecting the core transverse to the core axis, that the M.M.F. (magnetomotive force) produced by a current in the horizontal or vertical winding varies as $(1-A)\sin(\theta+B)+A\sin^3(\theta+B)$, it is not necessary to provide dynamic convergence deflection in one direction for the beams of a co-planar multi-gun cathode ray tube.

In the embodiment of Figs. 2 and 3 the desired M.M.F. pattern is obtained by means of a conductor distribution on a toroidal core, which distribution agrees with the equation:

$$n=N[(1-A)\sin(\theta+B)+A\sin^3(\theta+B)]$$

The exact value for the constant A in the above equation depends in magnitude and polarity upon the particular environment of the cathode ray tube of interest. However, it will usually have an absolute value between zero and one-tenth. The exact value is most easily found by empirical methods. By empirical methods I mean that deflection yokes having different A's have to be built and their responses noted. Generally speaking, the value of N, which is related to the total number of conductors of one winding in a quadrant, is discretionary and depends upon the inductance desired. If the three guns lie in a horizontal plane, a conductor distribution equation agreeing with the above sine cubed equation can be found with which dynamic convergence of the three beams can be had even though no dynamic vertical pre-deflection of the beams is utilized. Of course this equation can also be put in a $\sin^3\theta$ form because as is well known the sine cubed of $\theta$ is equal to terms involving sin $\theta$ and $\sin^3 \theta$.

In Fig. 4 there is shown another embodiment of my invention that is a deflection yoke having both toroidal and saddle-type windings. The core for the deflection coil of Fig. 4 comprises two integral sections constructed of material having a very high permeability. The inside of the first section 61 is conically shaped so that when the yoke is mounted on a cathode ray tube the inside surface of this section is substantially parallel with the bell of a television picture tube near where the bell joins the cylindrical neck. The inside of the second section 62 is cylindrically shaped so that it is substantially parallel with the tube neck. The particular shape utilized for the exterior of sections 61 and 62 is not critical. Wound about these two core sections there are four evenly spaced and uniformly distributed sets of conductors only two of which 64 and 65 have been shown in order to simplify the drawing. Sets 64 and 65 form a portion of the horizontal deflection winding. Mounted within the interior of the core sections there are four saddle-type windings only one of which is shown. The conductors of this winding 68 are formed in a very irregular shape that is determined in a certain mathematical manner. To find the positions for these conductors the field is calculated in accordance with methods well known to those skilled in the art for the deflection winding of Fig. 2 and Fig. 3. These conductors are then laid along the lines determined by the intersection of the surfaces of constant M.M.F. of this calculated field and the interior of the deflection core of Fig. 4 and Fig. 6. The number of conductors used in the winding 68 depends upon the inductance desired. That is, the more inductance that is needed to meet the requirements of the external circuits energizing the deflection coil windings, the greater the number of conductors. Of course there cannot be a conductor for each surface of constant M.M.F. and instead the surfaces are divided up into discrete steps the number of which depends upon the number of conductors. In other words if there are 10 conductors the total M.M.F. is divided into 10 discrete steps and the conductors are placed accordingly.

The two horizontal saddle-type windings are identical and the two vertical saddle-type windings are identical but the horizontal and vertical saddle-type windings are not necessarily identical although they may be in some yokes. The two evenly-distributed windings and the two saddle-type windings are connected in series for both the horizontal and the vertical deflection windings. For example, in Fig. 4 the current entering the horizontal external terminal 41 flows through the evenly distributed right half winding 64 and to a point 71 which the last conductor of winding 64 is joined to the outermost conductor of saddle winding 68. The current then flows through winding 68 to the innermost conductor. This conductor is joined by a conductor 73 to the innermost conductor of the horizontal top saddle-type winding (not shown). The current flows through this saddle-type winding to the outermost conductor to a point 74 at which this conductor is connected to the first conductor of the left half evenly distributed horizontal winding 65. Then the current flows through this winding to the last conductor, the end of which is connected to terminal 42.

The connections of the horizontal winding of Fig. 4 is illustrated in the circuit diagram of Fig. 5. In this figure all of the elements are the same as that shown in Fig. 4 with the exception of a saddle-type winding 76 which is the upper saddle-type horizontal winding. For purposes of simplification the saddle-type windings have been shown in spiral form rather than their true irregular form. It can be seen from Fig. 5 that all of the horizontal windings are in series. However, it should be realized that windings 64 and 68 could as well be joined in parallel with windings 76 and 65.

In Fig. 6 there is shown a partial section of the deflection coil of Fig. 4 mounted upon a cathode ray tube. Only a small portion of the cathode ray tube is shown. A portion 81 of the bell is shown connected to a portion 82 of the neck. It is seen that the core portion 61 is almost parallel with the bell portion 81. Likewise, core portion 62 is approximately parallel with neck portion 82. A vertical saddle-type winding 83 is shown with winding 68 because the horizontal and vertical saddle-type windings overlap. It is seen that due to the shape of the core the windings are very close to the bulb and neck of the tube. This provides a very efficient type deflection system.

In the foregoing discussion, it has been shown that my invention comprises a deflection coil having a novel conductor distribution that is such as to produce an M.M.F. not having a simple sinusoidal pattern but rather involving a sine cubed pattern as well. In one embodiment I utilize toroidal windings having a combined sinusoidal and sine cubed winding distribution. In another embodiment I obtain the same field as with the first embodiment by the use of evenly distributed toroidal windings and irregularly shaped saddle-type windings. In some applications it may be desirable to modify the M.M.F. pattern by the addition of a term comprising the sine to the fifth power. It has been found that the addition of this term has an effect only at maximum deflection angles. Also it has been found that sine functions higher than the fifth power are of no utility and should not be included. Thus, the distribution function should be such that the M.M.F. pattern has a term involving the sine of the core angle $\theta$ and of the sine cubed or the sine of three times the angle and if it is desired the sine of the fifth power of the angle or the sine of five times the angle. With this M.M.F., the dynamic convergence waveform that is required is greatly simplified and involves no term of the product of the horizontal and vertical deflection currents. Also, no dynamic convergence waveform is required for the direction that is normal to the plane of the guns of the cathode ray tube.

The above statements are valid not only for deflection yokes having toroidal cores but also for those having other shaped cores. Of course all of the yokes must produce an M.M.F. having the specified pattern. Two specific deflection yokes have been disclosed that provide this pattern. In view of the above teachings, one skilled in the art could no doubt conceive of others. For example, multi-layer rather than the disclosed single layer windings could be employed, or a completely saddle-type winding could be used instead of a combination toroidal and saddle-type. All of these yokes come within the teachings of my invention.

While I have illustrated a particular embodiment of my invention, it will of course be understood that I do not wish to be limited thereto, since various modifications can be made and I contemplate by the appended claims to cover all such modifications as come within the true spirit and scope of my invention.

What I claim as new and desire to secure by Letters Patent of the United States is:

1. A yoke for providing deflection of the beams in a multi-gun cathode ray tube in which the guns all lie in a plane, said yoke comprising: a toroidally-shaped magnetic core of high permeability; a horizontal deflection winding comprising conductors wound on and adjacent said core, the distribution of said conductors being such that the magnetomotive force generated by a current in said winding in a plane normal to the core axis and bisecting said core is at any angle $\theta$ in a quadrant of said core, proportional to $$(1-A)\sin(\theta+B)+A\sin^3(\theta+B)$$

and a vertical deflection winding comprising conductors wound on and adjacent said core, the distribution of said vertical deflection winding conductors beng such that the magnetomotve force generated by a current in said vertical deflection winding in a plane normal to the core axis and bisecting said core is, at any angle $\theta$ in a quadrant of said core, proportional to the $$(1-A)\sin(\theta+B)+A\sin^3(\theta+B)$$

2. The deflection yoke as defined in claim 1 in which said horizontal and vertical deflection windings each comprise two evenly distributed sets of conductors wound about said core and two saddle-type windings positioned adjacent the interior surface of said core.

3. A yoke for providing deflection of the beams in a multi-gun cathode ray tube in which the guns all lie in a plane, said yoke comprising: a toroidally-shaped core of high permeability; two sets of conductors with at least portions of said conductors wound on said core with conductor distributions such that the field produced by each of said sets is substantially the same as the field produced by a set of conductors wound about said core with a distribution that agrees with the equation:

$$n=N[(1-A)\sin(\theta+B)+A\sin^3(\theta+B)]$$

4. The yoke of claim 3 wherein said two sets of conductors each comprise two saddle-type windings.

5. The yoke of claim 3 wherein said two sets of conductors comprise: a first winding comprising two evenly distributed windings wound around opposite halves of said core and two identical saddle-type windings positioned adjacent the interior of said core on opposite sides thereof and midway between said evenly distributed windings; and a second winding comprising two evenly distributed windings wound around opposite halves of said core between said evenly distributed windings of said first winding, and two identical saddle-type windings positioned adjacent the interior of said core on opposite sides thereof, the centers of which are mid-way between the two evenly distributed windings of said second winding.

6. The yoke as defined in claim 5 in which the evenly distributed windings and the saddle-type windings of said first winding are connected in series and in which the evenly distributed windings and the saddle-type windings of said second winding are connected in series.

References Cited in the file of this patent

UNITED STATES PATENTS

| | | |
|---|---|---|
| 2,236,498 | Blain | Apr. 1, 1941 |
| 2,240,606 | Bobb | May 6, 1941 |
| 2,333,806 | Mauerer | Nov. 9, 1943 |
| 2,414,925 | Buckbee | Jan. 28, 1947 |
| 2,578,342 | Ekuall | Dec. 11, 1951 |
| 2,562,395 | Schlesinger | July 31, 1951 |
| 2,821,671 | Kratz et al. | Jan. 28, 1958 |